US007539459B2

(12) United States Patent
Steer

(10) Patent No.: US 7,539,459 B2
(45) Date of Patent: May 26, 2009

(54) ACTIVE NOISE CANCELLATION SYSTEM, ARRANGEMENT, AND METHOD

(75) Inventor: Clive Reginald Steer, Little Common (GB)

(73) Assignee: Edwards Vacuum, Inc., Tewksbury, MA (US)

( * ) Notice: Subject to any disclaimer, the term of this patent is extended or adjusted under 35 U.S.C. 154(b) by 594 days.

(21) Appl. No.: 10/816,703

(22) Filed: Apr. 2, 2004

(65) Prior Publication Data

US 2005/0226435 A1 Oct. 13, 2005

(51) Int. Cl.
*H04B 17/00* (2006.01)

(52) U.S. Cl. ................. 455/67.11; 455/67.12; 455/501; 455/67.13; 381/71.7; 381/71.8

(58) Field of Classification Search ..................... 455/9, 455/24, 501, 67.13, 67.11, 67.12, 67.14, 455/67.16, 222, 277.2; 381/71.7, 71.8, 94.1, 381/71.3, 71.11, 57; 702/196
See application file for complete search history.

(56) References Cited

U.S. PATENT DOCUMENTS 5,029,218 A * 7/1991 Nagayasu ................ 381/71.12
5,052,041 A * 9/1991 Nakanishi et al. .......... 381/71.3
6,589,727 B1 * 7/2003 Klenerman et al. ............ 435/4
6,625,285 B1 * 9/2003 Ohashi ...................... 381/71.3
2003/0228019 A1 * 12/2003 Eichler et al. .............. 381/71.8
2003/0231780 A1 * 12/2003 Enamito et al. ............ 381/94.1
2005/0119868 A1 * 6/2005 Scheidemann et al. ...... 702/196
2007/0086598 A1 * 4/2007 De Callafon ............. 381/71.11

* cited by examiner

*Primary Examiner*—Tan Trinh
(74) *Attorney, Agent, or Firm*—Ira Lee Zebrak

(57) ABSTRACT

Noise of a noise-producing object may be at least partially cancelled by a system that emits sound at a polarity substantially opposite to a polarity of detected noise and includes a member having elements disposed in the vicinity of a noise-producing object, some of the elements may be configured to emit noise, and some of the elements may be configured to detect noise and where a signal indicative of the detected noise may be received by a controller which sends a signal to cause at least some of the elements to emit sound at a polarity substantially opposite that of the detected noise, and includes an analyzer to determine when detected noise is indicative of one or more conditions of the noise producing object.

18 Claims, 5 Drawing Sheets

ACTIVE NOISE CANCELLATION SYSTEM, ARRANGEMENT, AND METHOD

FIELD OF THE INVENTION

The invention relates to a system and/or method for at least partially canceling noise produced by an object. In some examples, the system may detect noise and/or emit sound via one or more elements.

BACKGROUND OF THE INVENTION

There are many industrial machines, apparatuses, and applications that emit high levels of noise. In many cases, the unwanted noise is generated by movements of internal parts and external casings. Such high levels of noise are generally undesirable. For instance, subjecting industrial personnel to increased noise may not only be bothersome, but may also be harmful to their health. In addition, excessive noise may potentially cause damage to other apparatuses and/or the machines themselves, potentially reducing their life and increasing maintenance costs. For these and other reasons, legislation is being contemplated, and, in some instances, is currently in place, to require the reduction of noise in industrial applications.

Current methods of reducing noise include passive methods for damping sound. Sound dampening may involve placing padding around noisy machines and/or using thick walls of sound-absorbing materials in industrial environments. While more effective than not using any noise reduction at all, these passive methods suffer from several problems. For example, adding thick padding or walls adds to the weight, bulk, and volume of a machine, increasing the amount of space required to run the industrial application, and hence inflating its cost.

In some instances, certain types of noise may be difficult, if not impossible, to reduce or dampen completely using passive methods. Examples of such noises that are challenges for passive methods include loud pulses (e.g., pressure pulses from pumps and related applications), low frequency noise profiles (e.g., intense noise profiles), and resonating noises.

Accordingly, other structural configurations and methods of reducing noise are desired.

SUMMARY OF THE INVENTION

In the following description, certain aspects and embodiments of the invention will become evident. It should be understood that the invention, in its broadest sense, could be practiced without having one or more features of these aspects and embodiments. It should also be understood that these aspects and embodiments are merely exemplary.

One aspect, as embodied and broadly described herein, may relate to a system for at least partially canceling noise. The system may include a member configured to be located in the vicinity of a noise-producing object. The member may include a plurality of elements. Some (i.e., one or more) or all of the elements may be configured to detect noise from the noise-producing object. Some or all of the elements may be configured to emit sound. The system may also include a controller configured to receive at least one signal indicative of noise detected by at least some of the elements and to send at least one signal so as to cause at least some of the elements to emit sound at a polarity substantially opposite to a polarity of the detected noise.

In a further aspect, a system may include an enclosure configured to be placed at least partially around a noise-producing object. At least a portion of the enclosure may include a plurality of elements. At least some of the elements may be configured to emit sound. At least one noise detector may be configured to detect noise from the noise-producing object. The system may also include a controller configured to receive at least one signal indicative of noise detected by the at least one noise detector and to send at least one signal so as to cause at least some of the elements to emit sound at a polarity substantially opposite to a polarity of the detected noise.

Still another aspect may relate to a system for at least partially canceling noise. The system may include at least one noise detector, at least one sound emitter, and a controller configured to receive at least one signal indicative of noise detected by the at least one noise detector and to send at least one signal so as to cause the at least one sound emitter to emit sound at a polarity substantially opposite to a polarity of the detected noise. The system may further include an analyzer configured to analyze the noise detected by the at least one noise detector, the analyzer being configured to determine when noise detected by the at least one noise detector is indicative of at least one condition of the noise-producing object.

In a yet further aspect, an arrangement may include any system described herein and a noise-producing object.

Various aspects may include one, or more optional features. For example, the elements may include a piezoelectric material; the elements may include at least one of ceramic and quartz; the system may include a member configured to be located in the vicinity of the noise-producing object; the member may include a plurality of elements; the elements may substantially define at least one surface of the member; the elements may be arranged in an array resembling a generally mosaic form; the member may be configured in the form of a panel; the panel may have a substantially planar shape; the system may include a plurality of members; at least some of the members may be configured to be connected together so as to form an enclosure configured to be placed at least partially around the noise-producing object; the controller may be configured to cause at least some of the elements to emit sound at substantially the same intensity and frequency as that of the detected noise; the noise-producing object may include at least one of a pump, a motor, and a device for filling vessels; at least one noise detector may include at least one of the elements; at least one noise detector may be discrete from the elements; at least one of the elements may include the at least one sound emitter; at least one of the elements may include the at least one noise detector; the system may include an enclosure configured to be placed at least partially around the noise-producing object; at least a portion of the enclosure may include a plurality of elements; the elements may define at least one surface of the portion of the enclosure; the portion of the enclosure may be in the form of a panel and/or have a planar shape; at least one of the elements may include the at least one sound emitter; at least one of the elements may include the at least one noise detector; the analyzer may be configured to compare the detected noise to information relating to at least one noise profile of the object; and/or the analyzer may be configured to provide output indicative of a possible failure associated with the object.

A still further aspect, as embodied and broadly described herein, may relate to a method of at least partially canceling noise. The method may include detecting noise from a noise-producing object. The method may also include emitting sound at a polarity substantially opposite to polarity of the detected noise.

The method may include one or more optional features. For example, the analyzing may include comparing the detected noise to information relating to at least one noise profile of the object; the method may include providing output indicative of a possible failure associated with the object; the noise-producing object may include at least one of a pump, a motor, and a device for filling vessels; and/or the emitted sound may be at substantially the same intensity and frequency as that of the detected noise.

Aside from the structural and procedural relationships discussed above, the invention could include a number of other forms such as those described hereafter. It is to be understood that both the foregoing description and the following description are exemplary only.

BRIEF DESCRIPTION OF THE DRAWINGS

The accompanying drawings are incorporated in and constitute a part of this specification. The drawings illustrate several embodiments of the invention and, together with the description, serve to explain some principles of the invention. In the drawings.

DESCRIPTION OF THE EMBODIMENTS

Figure 1:
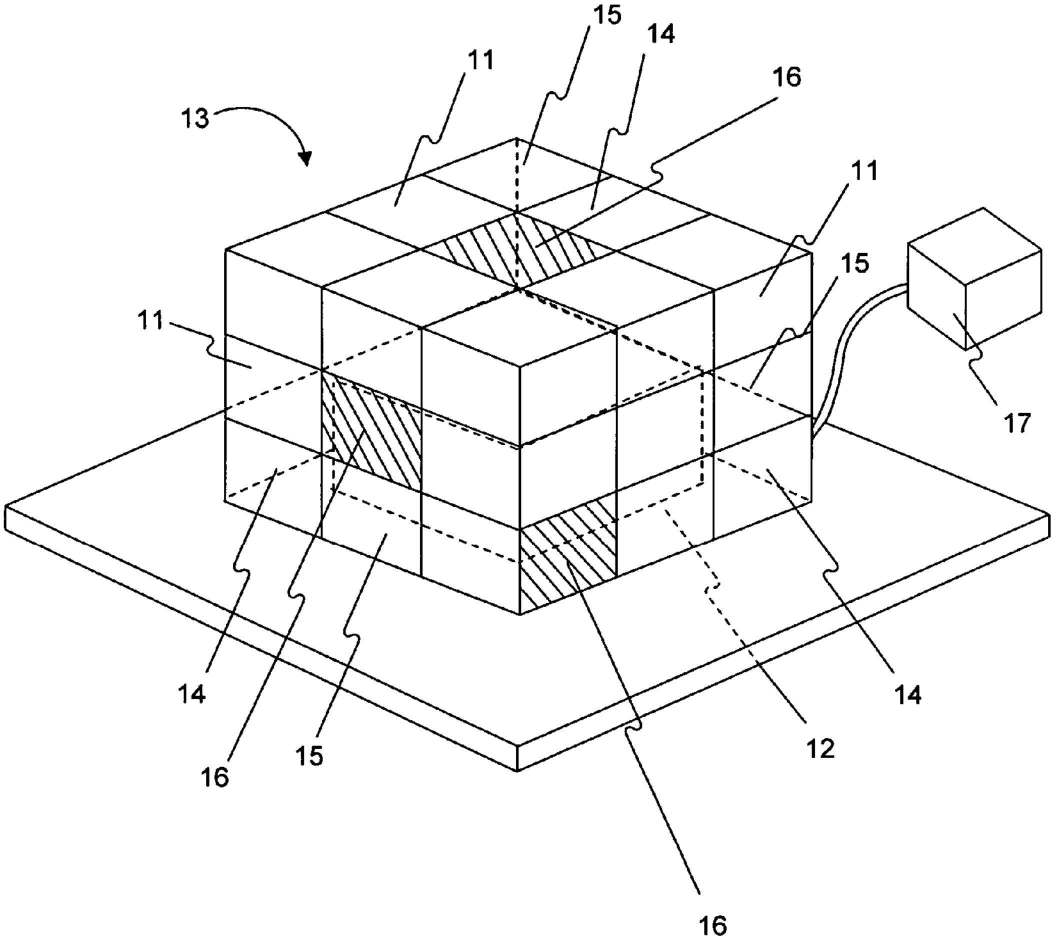
FIG. 1 is a perspective view of an embodiment of a system in accordance with the present invention.

Reference will now be made in detail to some possible embodiments of the invention, examples of which are illustrated in the accompanying drawings. Wherever possible, the same reference numbers are used in the drawings and the description to refer to the same or like parts.

FIG. 1 depicts an exemplary embodiment of a system for at least partially canceling noise. The system 10 may include one or more members 11 configured to be located in the vicinity of a noise-producing object 12, schematically shown in FIG. 1. The members 11 may be configured to be arranged so as to form an enclosure 13 configured to be placed at least partially around the noise-producing object 12.

The member(s) 11 and noise producing object 12 may define an arrangement (i.e., associated components). The noise-producing object 12 may be any apparatus, machine, application, assembly, sub-assembly, or part that produces noise. For example, the noise-producing object 12 may include one or more of a pump, motor, device for filling tanks, ball bearings, automobile exhaust system and/or any other object that produces noise. The noise-producing object 12 may produce any level of noise and may have any noise profile. For example, the noise-producing object 12 may produce a low frequency sound that is not able to be heard by unassisted human auditory senses and the sound may vary, for example, in polarity, pitch, intensity, and/or frequency over time. The noise-producing object 12 may produce the noise in any direction, and the noise profile may vary depending on the direction. For example, the noise profile above the noise-producing object 12 may have a polarity, pitch, intensity, and/or frequency differing from that of the noise profile at a side of the noise-producing object 12.

One or more of the members 11 may be configured as a panel and have a substantially planar shape. Other configurations are also possible. For example, one or more of the members 11 may be curved or have any other desired shape or configuration.

Each member 11 may have a configuration conducive to creating desired acoustical characteristics. For example, one or more of the members 11 may have a shape conducive to focus sound on a particular point, edge, surface, and/or volume of the noise-producing object 12 and/or conducive to receiving noise from a particular point, edge, surface, and/or volume of the noise-producing object 12.

Figure 2:
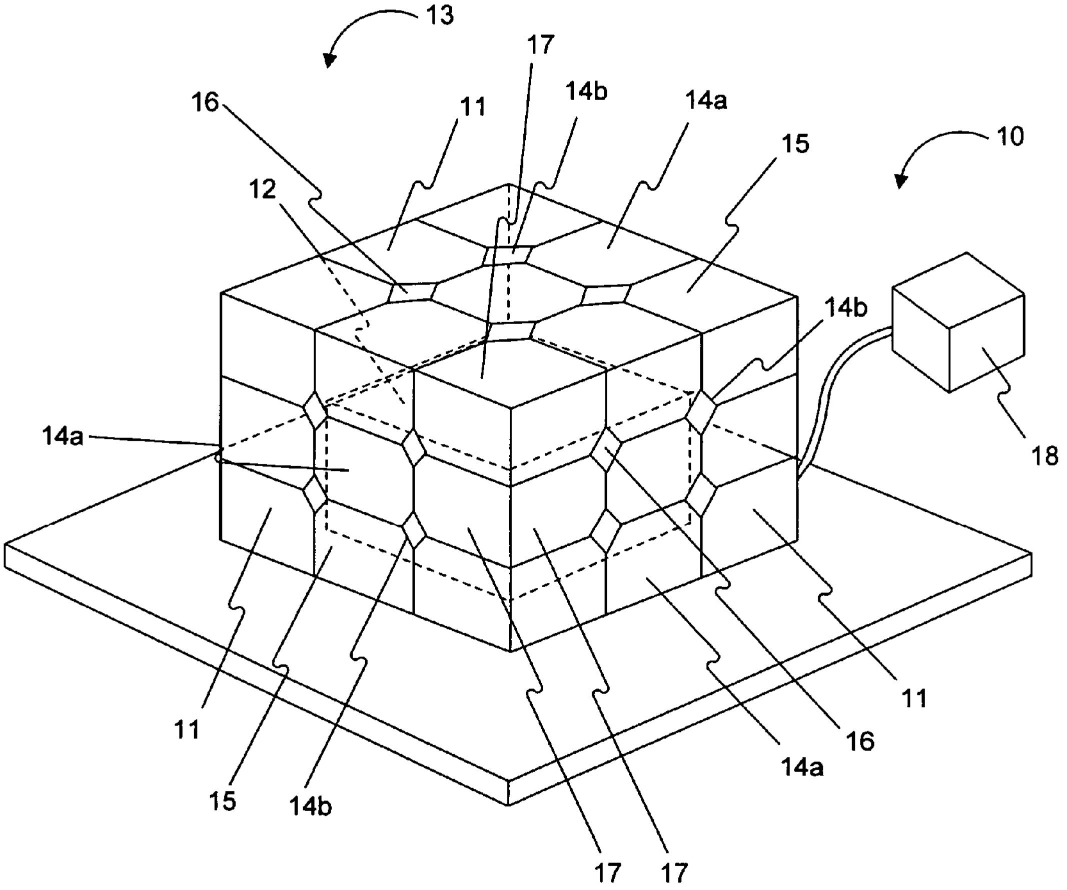
FIG. 2 is a perspective view of another embodiment of the system.
Figure 3:
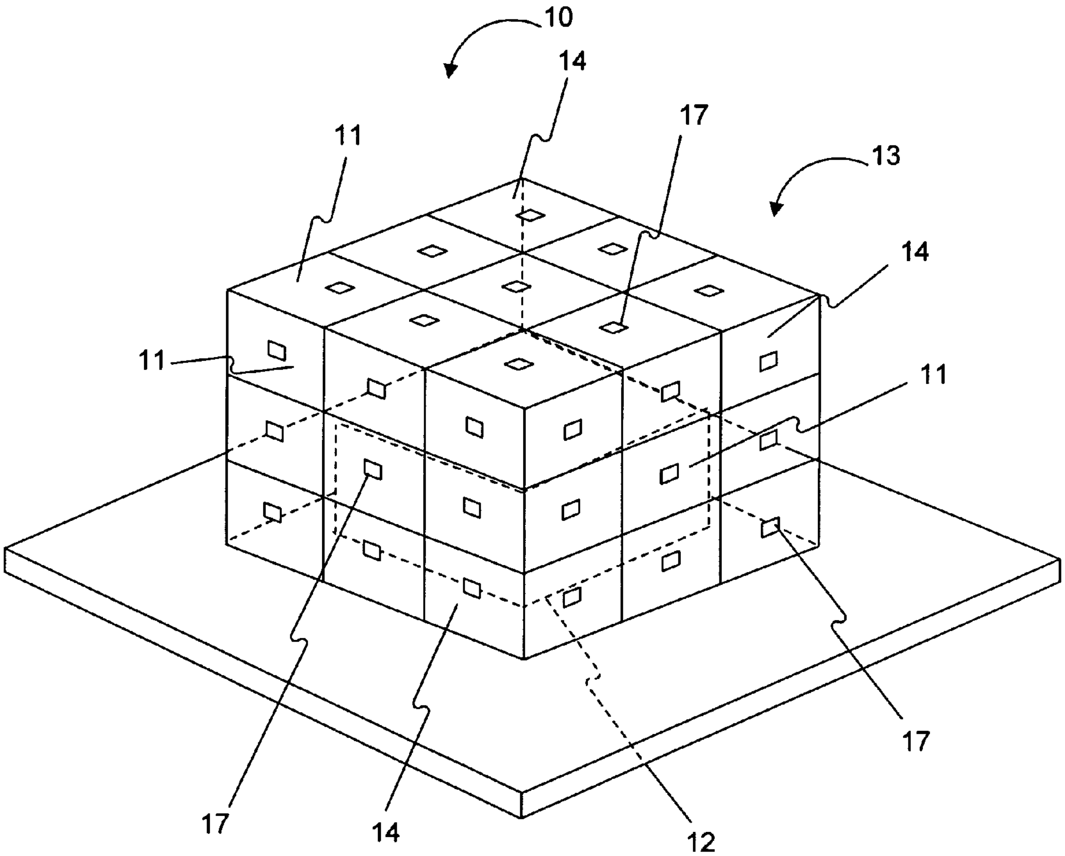
FIG. 3 is a perspective view of a further embodiment of the system.
Figure 4:
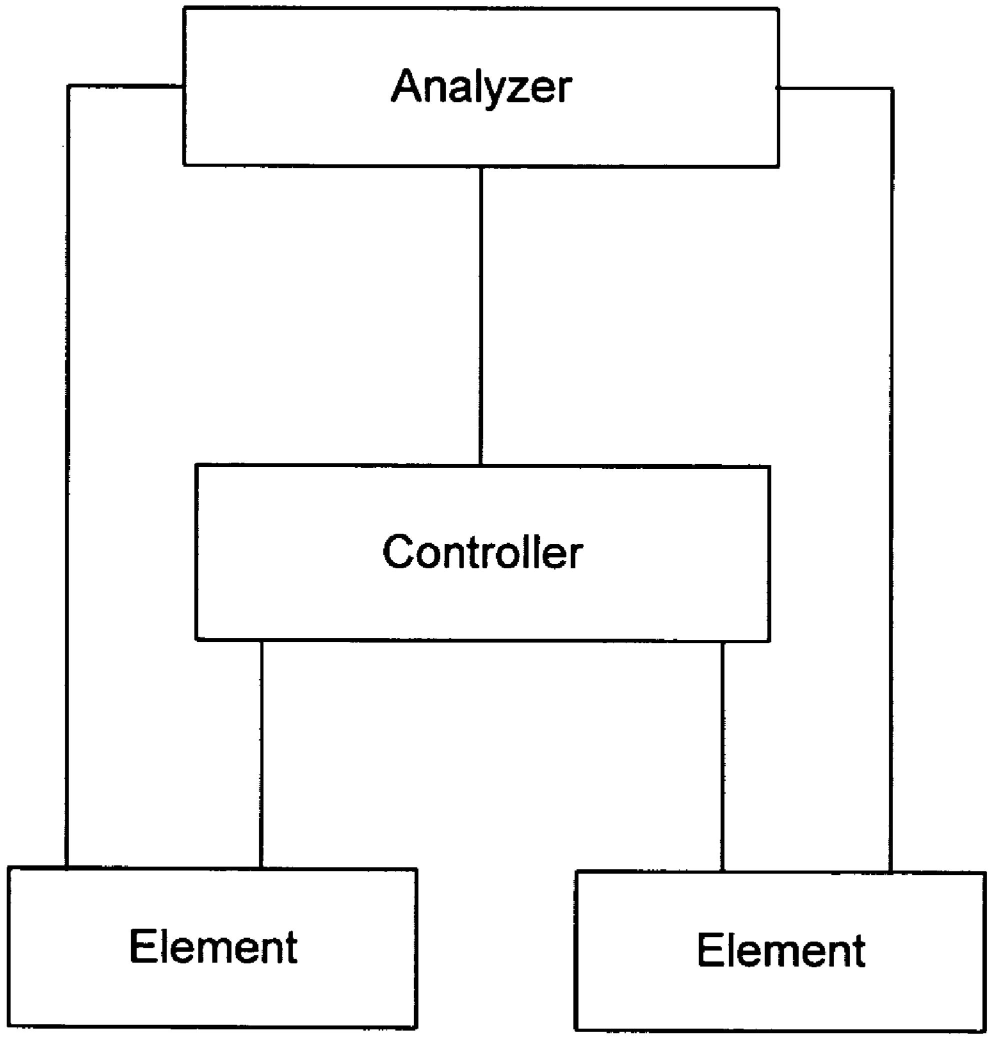
FIG. 4 is a schematic representation of the system of FIG. 2.

As mentioned above, the members 11 may be arranged so as to form the enclosure 13 to be placed at least partially around the noise-producing object. At least some of the members 11 may be configured to be connected together in any known manner so as to form the enclosure 13. As shown in FIGS. 1-3, the enclosure 13 may have a substantially box-like shape having one of the members 11 defining a top and four of the members 11 defining respective sides (Optionally, another member may define a bottom.) In such a configuration, the noise-producing object 12 may be placed in approximately the middle of the enclosure 13.

Rather than having the top and four sides completely surrounding the object 12, the members 11 may be arranged so that they only partially surround the object 12. In such an example, members 11 may be disposed in the vicinity of only one or more portions of the noise-producing object 12, for example, the portions that produce the most noise. For some objects, less than a complete enclosure might save space, mass, and/or costs. In certain instances, a single member 11 might be sufficient for some objects 12.

Although FIGS. 1-3 schematically show the enclosure 13 in a generally box-like form (i.e., having square or rectangular shaped sides), other shapes are possible. For example, the enclosure may be curved and/or have a more complex shape such as a sphere, a partial sphere (e.g., a hemisphere), a cylinder, a cone, or a generally parabolic configuration.

Each of the members 11 may include one or more elements 14 that may substantially define at least a portion of at least one surface of the member 11. As described in detail below, one or more elements 14 may be configured to detect noise from the object 12 and one or more of the elements 14 may be configured to emit sound. The elements 14 may be arranged in an array resembling a generally mosaic form. For example, FIG. 1 shows the elements 14 having substantially the same shape and being assembled together into a generally mosaic form so that each side of the enclosure has nine elements, for example.

In another example, FIG. 2 shows a system 10 with members 11 including elements 14*a*, 14*b* having differing shapes and forms. In this example, the elements 14*a*, 14*b* are arranged together into a generally mosaic form. Alternative configurations are also possible.

FIGS. 1-3 show elements 14, 14*a*, 14*b* having a substantially square shape. Some or all of the elements 14*a*, 14*b* may have any other polygonal shape, such as, for example, a hexagon shape.

As shown in FIG. 1, some or all of the elements 14 may be configured in the form of a sound-emitting element 15. The sound-emitting element 15 may be a loudspeaker or any other type of sound-emitting element known in the art. In some embodiments, the sound-emitting element 15 may include a cone-shaped speaker with a voice coil operating in a magnetic field that provides mechanical movements to emit sound. It may be possible to make the sound-emitting element more planar by substituting another material and/or device in place of the voice coil. For example, the sound-emitting element 15 may include a piezoelectric material, such as ceramic, quartz, plastic, or any other suitable material. In some examples, such a piezoelectric material may enable configuring the sound-emitting element 15 to be broader and/or shallower so as to make the sound-emitting element 15 in a more planar format. Piezoelectric material may also make it possible to have a reduced size for the sound-emitting element. For example, it may be possible to have a sound-emitting element with piezoelectric material reduced down to microscopic size.

The sound-emitting element 15 may be activated using any means known in the art to emit sound. For example, when the sound-emitting element 15 includes piezoelectric material, applying a particular amperage and/or voltage to the piezoelectric material may cause sound of a certain polarity, frequency, and/or intensity to be emitted by the piezoelectric material.

Some or all of the elements 14 may be configured in the form of a noise-detecting element 16. The noise-detecting element 16 may be a microphone or any other type of noise-detecting element known in the art. For example, the noise-detecting element 16 may be a variable capacitance diaphragm microphone. Such a microphone, or other type of noise-detecting element known in the art, may be compatible with and/or have a planar configuration.

Figure 5:
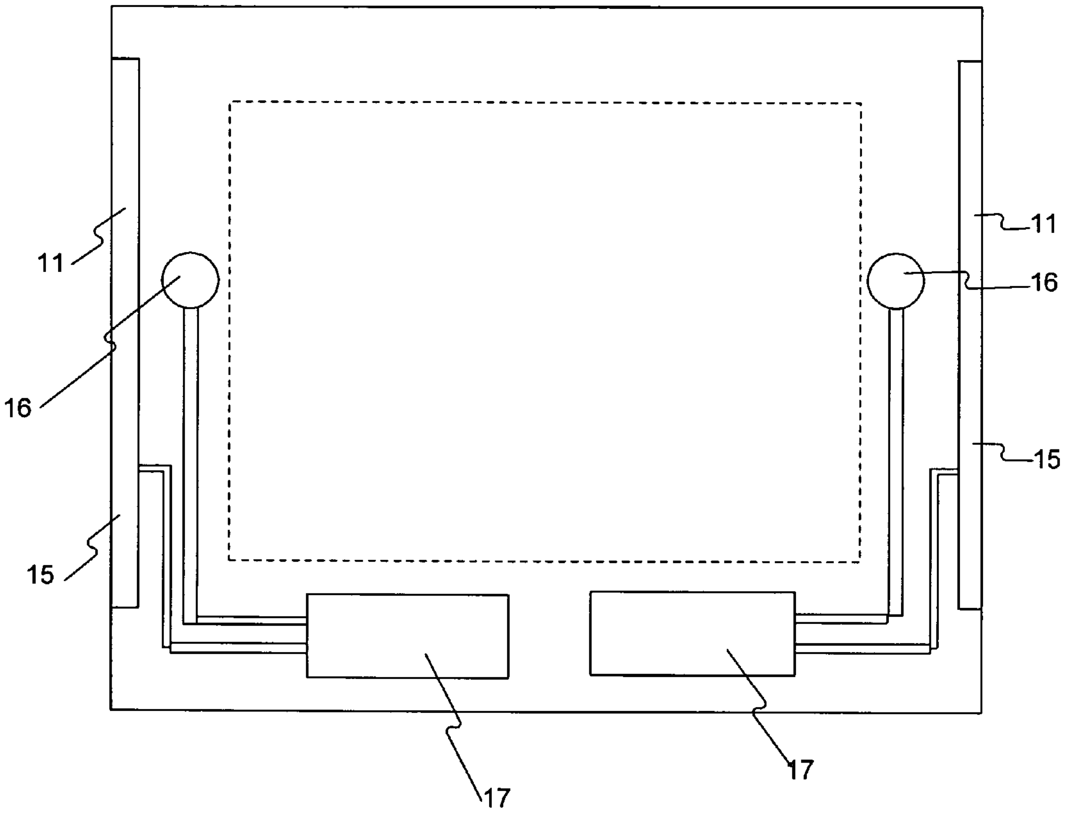
FIG. 5 is a schematic view of another embodiment of the system.

The noise-detecting element 16 may be configured in the same form as the sound-emitting element 15. In some embodiments, one or more individual elements 14 might be configured to be capable of providing both sound-emitting and noise-detecting (e.g., such an element could be formed of piezoelectric material). In some examples having one or more elements formed of piezoelectric material, noise applied to the element(s) may distort the piezoelectric material and cause the material to generate a voltage that may correspond to the applied noise, thus providing noise-detecting; and a voltage supplied to the element(s) may cause the piezoelectric material to become distorted and thereby generate sound, thus providing sound-emitting. As shown in FIG. 1, the noise-detecting element 16 may have substantially the same shape as the sound emitting element 15. Alternative configurations are also possible. For example, as shown in FIG. 5, the noise-detecting element 16 may be in the form of conventional microphone that is spaced from the member 11.

The noise detecting element 16 may be located anywhere with respect to the member 11 and/or the sound-emitting element 15. For example, as shown in FIGS. 1-3, the noise-detecting element 16 may be substantially coplanar with the sound-emitting element 15. Alternatively, as shown in FIG. 5, the noise detecting element 16 may also be in a different plane than the member 11 and/or sound-emitting element 15.

Each member 11 may have any number of noise-detecting elements 16 and sound-emitting elements 15. For example, FIG. 1 shows each member 11 having one noise-detecting element 16 and eight sound-emitting elements 15. In another example, FIG. 2 shows each member 11 having four noise detecting elements 16 and nine sound-emitting elements 15.

The noise-detecting elements 16 and sound-emitting elements 15 may be disposed on any portion of the member 11. For example, FIGS. 1 and 2 show the noise-detecting element 16 arranged on various portions of the respective members 11. Alternative configurations are also possible. For example, elements acting as noise-detecting elements may be dynamically changed to elements acting as sound-emitting elements (and/or vice-versa) during operation depending on the amount of noise applied to the member 11 and/or the level of noise cancellation desired.

In some examples, the noise-detecting elements 16 and sound-emitting elements 15 may be configured such that they each serve discrete functions (i.e., the noise-detecting elements may detect noise and not emit sound while the sound-emitting elements may emit sound and not detect noise) without interacting. Such a configuration may permit simultaneous and/or non-interactive functioning of the noise-detecting elements 16 and sound emitting elements 15, and may allow one or more noise-cancellation feedback and/or feedforward loops to be implemented.

The elements 14 may be arranged so as to emit and/or detect desired acoustical characteristics. For example, the elements 14 may be arranged so as to focus the noise emitted by the sound-emitting element(s) 15 onto a specific point, edge, surface, or volume. In another example, the noise-detecting element(s) 16 may be positioned so as to detect noise from a specific point, edge, surface, or volume of the noise-producing object 12.

The system 10 may include a controller 17 configured to receive at least one signal indicative of noise detected by at least some of the elements 14 and to send at least one signal so as to cause at least some of the elements 14 to emit sound at a polarity substantially opposite to a polarity of the detected noise. The controller 17 may also or alternatively be configured to cause at least some of the elements 14 to emit sound at substantially the same intensity and frequency as that of the detected noise. The controller 17 may be a processor, such as a computer, and/or microprocessor. The controller 17 may include an integrated circuit, hard-wired circuit, or any other type of controlling structure known in the art.

The controller 17 may be integrated into the system using any configuration known in the art. For example, FIG. 1 shows the controller 17 remotely located from the members 11. In a further example, FIG. 2 shows the controller 17 integrated into the members 11 so as to be part of the members 11. In another example, FIG. 3 shows the controllers 17 located on one or more elements of the members 11. Each controller 17 in FIG. 3 may be an independent control unit, or it may be a portion of a control unit. The controller(s) 17 or portions of controller(s) 17 may be connected to each other.

In various embodiments, the controller(s) 17 or portions of controller(s) 17 disposed on each element may communicate with other elements (e.g. adjacent elements) so as to form a neural-type network. Such a network may allow local groups of elements to function autonomously without continuous reference to a central or master controller or analyzer. The elements that make up the group may be static (e.g., predetermined and/or fixed) or dynamic (e.g., continuously changing depending on the situation). Such a network may provide at least a degree of fault tolerance to the overall system.

Any form of communication means could be used to convey signals between the controller 17 and elements 14. For example, the communication link could include a wired link or a wireless link such as an optical link.

The controller 17 may be part of an open or closed control loop. The closed control loop may include the controller 17, one or more members 11, and one or more elements 14. The open control loop may include the controller 17, one or more members 11, one or more elements 14, and a device that enters external information into the open control loop. The device may enter information into the open control loop that enables the system 10 to anticipate the noise profile to be cancelled. For example, the device may synchronize the entry of information with the occurrence of an event, e.g., the noisy opening of a valve, and allow the system 10 to adjust prior to receiving actual feedback of the occurrence itself. The control loop may be a re-active loop (feedback), pro-active loop (feedforward), or a combination of the two. A feedback loop may be used when there are small and/or slow amplitude changes in the noise. A feedforward loop may be used when there are large and/or rapid amplitude changes in the noise.

The signals passing to and from the controller 17 may have a high frequency so as to enable the controller 17 to substantially instantaneously respond and/or react to input, for example, from the noise-detecting element 16. Such a response and/or reaction may include transmitting a signal to the sound-emitting element 15, thereby causing the element 15 to emit a particular sound.

The system may include an analyzer 18 configured to analyze data received from one or more elements 14, for example, a signal corresponding to noise detected by one or more noise detectors 16. The data may be received directly from the elements 14, or may be received from the elements 14 via the controller 17. The analyzer 18 may have a configuration like that of the controller 17 described above.

The analyzer 18 may be configured to determine whether the detected noise is indicative of a condition of the noise-producing object 12. For example, the analyzer 18 may be configured to compare the detected noise to information relating to one or more noise profiles of the object. Such noise profiles may include a predetermined noise profile which indicates a possible failure associated with the object. Alternative predetermined noise profiles are possible, including a predetermined noise profile which indicates that the noise-producing object requires maintenance. In another example, the analyzer 18 may be configured to detect changes in the noise profile. A change in the noise profile may be indicative of a possible failure of the noise producing object 12 or the necessity of maintenance.

The analyzer 18 may be configured to provide an output corresponding to the analysis provided by the analyzer 18. For example, the output may be indicative of a possible failure associated with the object and/or the necessity of performing maintenance on the object.

The output from the analyzer 18 may be provided via any communication means and/or indication means that might used to inform one or more individuals. The output may also be looped back into the system. For example, the output may be used to adjust the sound emitting elements 15.

The controller 17 and the analyzer 18 may be separate components linked by communication means, or may be integrated into a single component. For example, one processor may serve as both the controller 17 and the analyzer 18. The controller 17 and/or the analyzer 18 may be configured to apply appropriate timing to compensate for propagation delays of noise/sound traveling through air and delays of electrical signals traveling to and from the controller 17 and analyzer 18. For example, a time delay to compensate for the difference in speeds may be introduced into any or all of the controller 17, analyzer 18, and communication means.

Any of the exemplary systems described above could be used in a method of at least partially canceling noise. (Alternatively, such a method could be performed by a configuration differing from the system described herein.) In one exemplary method, the noise-detecting element 16 may detect noise from the noise producing object 12 (e.g., from a portion of a noise-producing object 12). The noise-detecting element 16 may then send to the controller 17 a signal corresponding to the detected noise. The noise-detecting element 16 may also send such a signal to the analyzer 18.

The controller 17 receives the signal(s) corresponding to the detected noise, and based on the detected noise sends signal(s) to one or more sound-emitting elements 15. (The signals to each element 15 could the same or different.) The controller 17 may also send signals to the analyzer 18.

The sound-emitting elements 15 receive signal(s) from the controller 17, and based on the signal(s), emit sounds. Optionally, the signal may include specific characteristics that cause the sound-emitting elements 15 to emit a sound of a particular polarity, frequency, and/or intensity. The sound emitted by the sound-emitting elements 15 may have a polarity that is substantially opposite the polarity of the detected noise so as to at least partially cancel out the noise emitted by the noise-producing object 12. In some examples, by adjusting the polarity, frequency, and/or intensity of the sound emitted by the sound-emitting elements 15, for example via the controller 17, it may be possible to almost completely cancel the noise emitted by the noise-producing object 12.

The analyzer 18 may receive one or more signals from noise-detecting elements 16 and/or from the controller 17. The analyzer 18 may then, for example, compare the detected noise to information relating to at least one noise profile of the object 12. Examples of such information may include predetermined noise profiles that indicate, for example, potential failure of the object 12 and/or the necessity of the maintenance of the object 12. The analyzer 18 may then produce an output indicative of a condition of the object.

In some examples, the analyzer 18 may have a memory means that might be used to store signals received by the analyzer 18. Additionally (or alternatively), the output of the analyzer 18 could be stored in the memory means. After a condition of the object 12 has occurred, an individual might be able to retrieve the stored data from the analyzer 18, and use the stored data to detect future occurrences of the condition. For example, after an object 12 has failed, an individual may retrieve a stored noise profile just prior to the failure of the object 12. The analyzer 18 may then be configured such that when it detects a substantially similar noise profile in the future, it will output an indication that signifies an imminent or existing failure of the object 12. The analyzer 18 could be configured in a similar manner for alternative conditions.

One possible advantage to at least partially canceling out the noise of a noise-producing object by using sound-emitting elements may be that the apparent stiffness/rigidity of the associated structure may be increased. By canceling out the noise of the noise-producing object with sound, a reciprocal/counteracting force may be created which may increase apparent stiffness/rigidity. In some cases, it may be desirable to use any of the devices and methods described above to create a structural stiffness/rigidity system that uses acoustical characteristics to achieve the stiffness/rigidity. Such a system may be desirable because it may cost less, take up less volume, have less mass, and allow for the variance of an apparent stiffness/rigidity of the structure. For example by adjusting the output of the sound-emitting elements, the amount of noise cancelled, and hence the apparent stiffness/rigidity of the structure, may be varied.

It should be understood that any of the features associated with one particular embodiment described above may be associated with any one of the other embodiments. For example, the controllers 17, as shown in FIG. 3, could be combined with the analyzer 18 shown in FIG. 2.

In addition, it should be understood that any of the features associated with one particular embodiment may be removed. For example, a member 11 may have sound-emitting elements 15, but not noise-detecting elements 16. This may be desirable, for example, to reduce the complexity of the system while still maintaining at least some noise-cancellation characteristics.

In some examples, separate noise reduction may be used for different portions of the noise-producing object.

In one example, a portion of the noise-producing object may produce one noise profile (e.g., a high frequency sound), while the noise-producing object in its entirety may produce another noise profile (e.g., a low frequency sound). Accordingly, one noise reduction system may be disposed in the vicinity of the portion, while another noise reduction system may be disposed so as to at least partially surround both the object and the system associated with the object portion.

It will be apparent to those skilled in the art that various modifications and variations can be made to the structure and methodology described herein. This, it should be understood that the invention is not limited to the subject matter discussed in the specification and shown in the drawings. Rather, the present invention is intended to include modifications and variations.

What is claimed is:

1. A system for at least partially canceling noise, the system comprising: a member configured to be located in the vicinity of a noise producing object, wherein the member comprises a plurality of elements, at least some of the elements being configured to detect noise from the noise producing object, and at least some of the elements being configured to emit sound; and a controller configured to receive at least one signal indicative of noise detected by at least some of the elements and to send at least one signal so as to cause at least some of the elements to emit sound at a polarity substantially opposite to a polarity of the detected noise, and at a freguency and intensity substantially the same as that of the detected noise, and wherein the elements are arranged in an array resembling a generally mosaic form.

2. A system for at least partially canceling noise, the system comprising: a member configured to be located in the vicinity of a noise producing object, wherein the member comprises a plurality of elements, at least some of the elements being configured to detect noise from the noise producing object, and at least some of the elements being configured to emit sound; and a controller configured to receive at least one signal indicative of noise detected by at least some of the elements and to send at least one signal so as to cause at least some of the elements to emit sound at a polarity substantially opposite to a polarity of the detected noise, and at a freguency and intensity substantially the same as that of the detected noise, and wherein the member is configured in the form of a panel.

3. The system of claim 2, wherein the panel has a substantially planar shape.

4. A system for at least partially canceling noise, the system comprising: a member configured to be located in the vicinity of a noise producing object, wherein the member comprises a plurality of elements, at least some of the elements being configured to detect noise from the noise producing object, and at least some of the elements being configured to emit sound; and a controller configured to receive at least one signal indicative of noise detected by at least some of the elements and to send at least one signal so as to cause at least some of the elements to emit sound at a polarity substantially opposite to a polarity of the detected noise, and at a freguency and intensity substantially the same as that of the detected noise and wherein the controller is configured to cause at least some of the elements to emit sound at substantially the same intensity and frequency as that of the detected noise.

5. A system for at least partially canceling noise, the system comprising: an enclosure configured to be placed at least partially around a noise producing object, wherein at least a portion of the enclosure comprises a plurality of elements, at least some of the elements being configured to emit sound; at least one noise detector configured to detect noise from the noise producing object; and a controller configured to receive at least one signal indicative of noise detected by the at least one noise detector and to send at least one signal so as to cause at least some of the elements to emit sound at a polarity substantially opposite to a polarity of the detected noise, and at a freguency and intensity substantially the same as that of the detected noise, and wherein the elements are arranged in an array resembling a generally mosaic form.

6. A system for at least partially canceling noise, the system comprising: an enclosure configured to be placed at least partially around a noise producing object, wherein at least a portion of the enclosure comprises a plurality of elements, at least some of the elements being configured to emit sound; at least one noise detector configured to detect noise from the noise producing object; and a controller configured to receive at least one signal indicative of noise detected by the at least one noise detector and to send at least one signal so as to cause at least some of the elements to emit sound at a polarity substantially opposite to a polarity of the detected noise, and at a frequency and intensity substantially the same as that of the detected noise, and wherein the portion of the enclosure is configured in the form of a panel.

7. The system of claim 6, wherein the portion of the enclosure has a substantially planar shape.

8. A system for at least partially canceling noise, the system comprising: an enclosure configured to be placed at least partially around a noise producing object, wherein at least a portion of the enclosure comprises a plurality of elements, at least some of the elements being configured to emit sound; at least one noise detector configured to detect noise from the noise producing object; and a controller configured to receive at least one signal indicative of noise detected by the at least one noise detector and to send at least one signal so as to cause at least some of the elements to emit sound at a polarity substantially opposite to a polarity of the detected noise, and at a frequency and intensity substantially the same as that of the detected noise, and wherein enclosure comprises a plurality of portions configured to be connected together.

9. A system for at least partially canceling noise, the system comprising: an enclosure configured to be placed at least partially around a noise producing object, wherein at least a portion of the enclosure comprises a plurality of elements, at least some of the elements being configured to emit sound; at least one noise detector configured to detect noise from the noise producing object; and a controller configured to receive at least one signal indicative of noise detected by the at least one noise detector and to send at least one signal so as to cause at least some of the elements to emit sound at a polarity substantially opposite to a polarity of the detected noise, and at a frequency and intensity substantially the same as that of the detected noise, and wherein the controller is configured to cause at least some of the elements to emit sound at substantially the same intensity and frequency as that of the detected noise.

10. A system for at least partially canceling noise, the system comprising: at least one noise detector configured to detect noise from a noise producing object; at least one sound emitter configured to emit sound; a controller configured to receive at least one signal indicative of noise detected by the at least one noise detector and to send at least one signal so as to cause the at least one sound emitter to emit sound at a polarity substantially opposite to a polarity of the detected noise and at a freguency and intensity substantially the same as that of the detected noise; and an analyzer configured to analyze the noise detected by the at least one noise detector, the analyzer being configured to determine when noise detected by the at least one noise detector is indicative of at least one condition of the noise producing object, and wherein the analyzer is configured to compare the detected noise to information relating to at least one noise profile of the object.

11. A system for at least partially canceling noise, the system comprising: at least one noise detector configured to detect noise from a noise producing object; at least one sound emitter configured to emit sound; a controller configured to receive at least one signal indicative of noise detected by the at least one noise detector and to send at least one signal so as to cause the at least one sound emitter to emit sound at a polarity substantially opposite to a polarity of the detected noise and at a frequency and intensity substantially the same as that of the detected noise; and an analyzer configured to analyze the noise detected by the at least one noise detector, the analyzer being configured to determine when noise detected by the at least one noise detector is indicative of at least one condition of the noise producing object, and wherein the analyzer is configured to provide output indicative of a possible failure associated with the object.

12. A system for at least partially canceling noise, the system comprising: at least one noise detector configured to detect noise from a noise producing object; at least one sound emitter configured to emit sound; a controller configured to receive at least one signal indicative of noise detected by the at least one noise detector and to send at least one signal so as to cause the at least one sound emitter to emit sound at a polarity substantially opposite to a polarity of the detected noise and at a freguency and intensity substantially the same as that of the detected noise; and an analyzer configured to analyze the noise detected by the at least one noise detector, the analyzer being configured to determine when noise detected by the at least one noise detector is indicative of at least one condition of the noise producing object, and wherein the at least one sound emitter and the at least one noise detector are arranged in an array resembling a generally mosaic form.

13. A system for at least partially canceling noise, the system comprising: at least one noise detector configured to detect noise from a noise producing object; at least one sound emitter configured to emit sound; a controller configured to receive at least one signal indicative of noise detected by the at least one noise detector and to send at least one signal so as to cause the at least one sound emitter to emit sound at a polarity substantially opposite to a polarity of the detected noise and at a frequency and intensity substantially the same as that of the detected noise; and an analyzer configured to analyze the noise detected by the at least one noise detector, the analyzer being configured to determine when noise detected by the at least one noise detector is indicative of at least one condition of the noise producing object, further comprising a member configured to be located in the vicinity of the noise producing object, wherein the member comprises a plurality of elements, at least one of the elements comprising the at least one sound emitter, and wherein the member is configured in the form of a panel.

14. The system of claim 13, wherein the panel has a substantially planar shape.

15. A system for at least partially canceling noise, the system comprising: at least one noise detector configured to detect noise from a noise producing object; at least one sound emitter configured to emit sound; a controller configured to receive at least one signal indicative of noise detected by the at least one noise detector and to send at least one signal so as to cause the at least one sound emitter to emit sound at a polarity substantially opposite to a polarity of the detected noise and at a frequency and intensity substantially the same as that of the detected noise; and an analyzer configured to analyze the noise detected by the at least one noise detector, the analyzer being configured to determine when noise detected by the at least one noise detector is indicative of at least one condition of the noise producing object, and wherein the controller is configured to cause the at least one sound emitter to emit sound at substantially the same intensity and frequency as that of the detected noise.

16. A method of at least partially canceling noise, comprising: noise detector mean for detecting noise from a noise producing object; emitting sound at a polarity substantially opposite to polarity of the detected noise, and at a frequency and intensity substantially the same as that of the detected noise; and analyzing the detected noise so as to determine when the detected noise is indicative of at least one condition of the noise producing object, and wherein the analyzing comprises comparing the detected noise to information relating to at least one noise profile of the object.

17. A method of at least partially canceling noise, comprising: noise detector mean for detecting noise from a noise producing object; emitting sound at a polarity substantially opposite to polarity of the detected noise, and at a frequency and intensity substantially the same as that of the detected noise; and analyzing the detected noise so as to determine when the detected noise is indicative of at least one condition of the noise producing object, and further comprising providing output indicative of a possible failure associated with the object.

18. A method of at least partially canceling noise, comprising: noise detector mean for detecting noise from a noise producing object; emitting sound at a polarity substantially opposite to polarity of the detected noise, and at a frequency and intensity substantially the same as that of the detected noise; and analyzing the detected noise so as to determine when the detected noise is indicative of at least one condition of the noise producing object, and wherein the emitted sound is at substantially the same intensity and frequency as that of the detected noise.

* * * * *